United States Patent
Suk et al.

(12)

(10) Patent No.: US 6,442,155 B1
(45) Date of Patent: Aug. 27, 2002

(54) DEVICE AND METHOD FOR CONTROLLING TRANSMISSION POWER OF A MOBILE STATION IN A MULTI-CARRIER CDMA MOBILE COMMUNICATION SYSTEM

(75) Inventors: Won-Kyu Suk, Songnam; Sang-Min Bae, Suwon, both of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/454,092

(22) Filed: Dec. 3, 1999

(51) Int. Cl.$^7$ ............................................... H04B 7/216
(52) U.S. Cl. ...................... 370/342; 370/318; 370/370; 455/522; 375/130
(58) Field of Search ............................ 455/69, 70, 522; 370/318, 320, 335, 342, 441, 276, 279, 283, 293, 252, 209; 375/130, 135, 136, 140, 146, 147, 211

(56) References Cited

U.S. PATENT DOCUMENTS 6,151,328 A * 11/2000 Kwon et al. ................ 370/441

2001/0006888 A1 * 7/2001 Posti et al. .................. 455/69

* cited by examiner

*Primary Examiner*—Doris H. To
(74) *Attorney, Agent, or Firm*—Dilworth & Barrese, LLP

(57) ABSTRACT

A device for controlling transmission power of a mobile station in a multi-carrier CDMA mobile communication system, which includes a digital mixer that receives and divides a wide band multi-carrier signals according to carriers and also filters the divided carrier signals. A searcher receives and separates the divided carrier signals according to carrier signals which have the same path delay. A plurality of fingers separately (and in parallel) despread and demodulate carrier signals which have the same path delay, and synchronize the demodulated signals. Parallel/serial (P/S) converters convert the demodulated signals provided in parallel from the fingers to serial signals. De-randomizers de-randomize the converted demodulated serial signals using a subscriber identification code. A combiner divides the de-randomized demodulated signals according to cells, and provides a transmission device of a mobile station with a transmission gain control signal for reverse power control based upon power control bits extracted from the divided demodulated signals.

6 Claims, 5 Drawing Sheets

DEVICE AND METHOD FOR CONTROLLING TRANSMISSION POWER OF A MOBILE STATION IN A MULTI-CARRIER CDMA MOBILE COMMUNICATION SYSTEM

PRIORITY

This application claims priority to an application entitled Device and Method for Controlling Transmission Power of Mobile Station in Multi-Carrier CDMA Mobile Communication System filed in the Korean Industrial Property Office on Dec. 3, 1998 and assigned Ser. No. 98-52758, the contents of which are hereby incorporated by reference.

BACKGROUND OF THE INVENTION

1. Field of the Invention

The present invention relates generally to a power control device and method in a CDMA mobile communication system, and in particular, to a reverse link power control device and method in a multi-carrier CDMA mobile communication system.

2. Description of the Related Art

A CDMA (Code Division Multiple Access) mobile communication system performs power control in order to enable communication between a base station and a mobile station at proper power. Such power control can be divided into forward power control and reverse power control. With regard to forward power control, the base station controls its transmission power to transmit information to the mobile station at proper power. With regard to reverse power control, the base station measures receiving power of a signal transmitted from the mobile stations in order to control the transmission power of the mobile station.

More specifically, with regard to reverse power control, the receiving side (i.e., base station) measures receiving power of a signal transmitted from at least one transmission side (i.e., mobile station), and provides a power control bit (PCB) corresponding to the measured results to the transmission side so that the transmission side can control its transmission power.

Existing CDMA mobile communication systems employ a single carrier system as defined by IS-95A and IS-95B. Accordingly, the base station transmits the PCB for reverse power control with respect to only one carrier, and the mobile station also extracts the PCB with regard to only one carrier when performing power control. For example, when receiving power of a signal transmitted from the mobile station is higher or lower than a threshold, the base station transmits the PCB for increasing or decreasing transmission power of the mobile station, with regard to only one carrier. The mobile station then analyzes the transmitted PCB for the single carrier, and increases or decreases its transmission power to obtain a corresponding power level of the reverse link.

FIG. 1 is a diagram for explaining a power control procedure in a CDMA mobile communication system using a single carrier. Referring to FIG. 1, in an IS-95 mobile communication system, a 20 ms frame is comprised of 16 power control groups (PCGs), of 1.25 ms duration. Each 1.25 ms power control group is divided into 24 symbol durations, one or two of first 16 symbols being punctured for the PCBs. In the case where the I-channel and the Q-channel is transmitted over the traffic channel different from each other, only one of 16 symbols is punctured. In the case where the I-channel and the Q-channel are transmitted over the same traffic channel, two consecutive symbols of 16 symbols are punctured.

Further, a starting point of the PCB is determined by a 4-bit long code mask corresponding to the last 4 symbols of the 24 symbols constituting the previous PCG.

Future CDMA mobile communication systems will adopt a multi-carrier system defined by IMT-2000. Therefore, it is necessary to define a power control method for such a multi-carrier system.

SUMMARY OF THE INVENTION

It is, therefore, an object of the present invention to provide a device and method for performing reverse power control in a multi-carrier CDMA mobile communication system. Reverse power control refers to adjusting the transmission power of the transmission side or mobile station.

It is another object of the present invention to provide a device and method for controlling transmission power of a mobile station based on at least one power control bit extracted from a multi-carrier signal transmitted from a base station in a CDMA mobile communication system.

To achieve the above object, there is provided a device for controlling transmission power of a mobile station in a multi-carrier CDMA mobile communication system. The device includes a digital mixer for dividing received wide band multi-carrier signals according to, carriers and filtering the divided carrier signals. A searcher separates the divided carrier signals according to carrier signals which have sustained the same path delay. Fingers perform despreading and demodulation on the carrier signals which have experienced the same path delay, the carrier signals being provided in parallel from the digital mixer. The fingers also synchronize the demodulated signals. Parallel/serial (P/S) converters convert the demodulated signals provided in parallel from the fingers to serial signals and de-randomizers de-randomize the converted demodulated serial signals using a subscriber identification code. A combiner divides the de-randomized demodulated signals according to cells, and provides a transmission device of a mobile station with a transmission gain control signal for reverse power control according to power control bits extracted from the divided demodulated signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
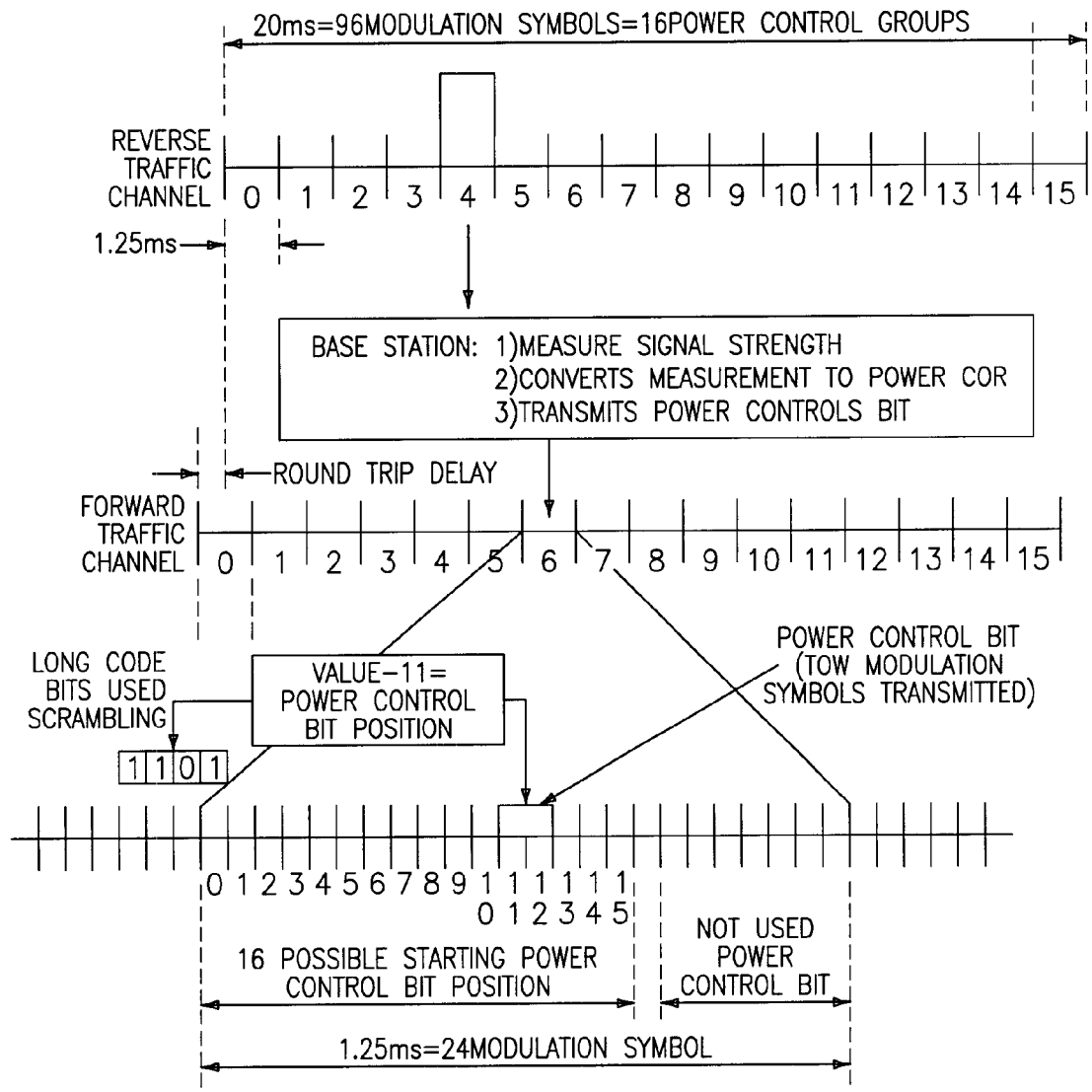
FIG. 1 is a diagram representing transmission of a power control bit in an IS-95 CDMA mobile communication system.
Figure 2:
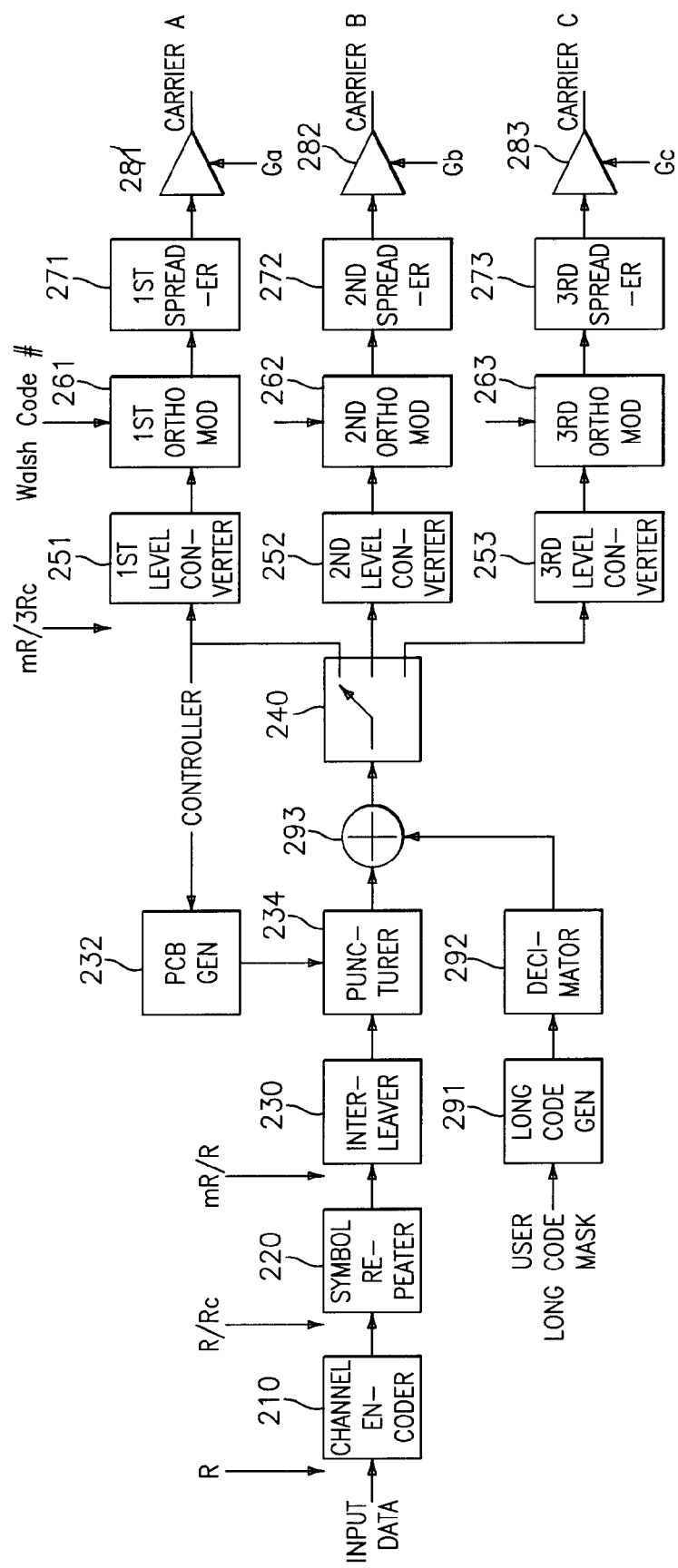
FIG. 2 is a block diagram illustrating a transmission device in a multi-carrier CDMA mobile communication system.

FIG. 2 shows a transmission device in a multi-carrier CDMA mobile communication system according to an embodiment of the present invention. A channel encoder 210 (which may include a convolutional encoder and a puncturer) encodes input data into symbols and punctures the symbols. The input data has different bit rates. A symbol repeater 220 repeats the coded data (i.e., symbol) output from the channel encoder 210 such that the symbols of different rates have the same symbol rate. That is, the symbol repeater 220 matches the symbol rates of all the coded data. An interleaver 230 interleaves an output of the symbol repeater 220. Typically, a block interleaver is used for the interleaver 230.

A power control bit (PCB) generator 232 generates a power control bit according to a power control command from a controller which manages power control. The above-stated power control command is a power control command that responds to the receiving power of a signal transmitted from the mobile station. For example, when the receiving power is lower than a threshold, the power control command will be a power-up command, and when the receiving power is higher than the threshold, the power control command will be a power-down command. A puncturer 234 punctures a specific bit out of the output bits of the interleaver 230, which is located at a position where a power control bit will be inserted, and inserts the power control bit at the punctured position.

A long code generator 291 generates a long code which is identical to that generated in the subscriber side. The long code is a unique user identification code assigned to each subscriber. A decimator 292 decimates the long code so as to match the rate of the long code to the symbol rate of the interleaved data output from the interleaver 230. An adder 293 adds the output of the interleaver 230 and the output of the decimator 292. An exclusive OR gate is typically used for the adder 293.

A demultiplexer 240 sequentially demultiplexes the data output from the adder 293 to each carrier. First to third level converters 251–253 are binary-to-4-level converters that convert the demultiplexed binary data output from the demultiplexer 240 to 4-level data. First to third orthogonal modulators 261–263 modulate (or spread) the data output from the first to third level converters 251–253 to orthogonal codes for the corresponding channels, respectively. A Walsh code is typically used for the orthogonal code. First to third spreaders 271–273 modulate (or spread) the outputs of the first to third orthogonal modulators 261–263, respectively. QPSK (Quadrature Phase Shift Keying) spreaders, which are complex spreaders, are typically used for the first to third spreaders 271–273. First to third attenuators 281–283 control gains of the modulated signals output from the first to third spreaders 271–273 according to attenuation control signals. Ga–Gc, respectively. The signals output from the first to third attenuators 281–283 are carried by different carriers A, B and C. That is, the signals finally output to the radio channel from the transmission device are modulated by the multiple carriers.

The forward link having the structure of FIG. 2, i.e., the multi-carrier transmission device, encodes the input data into 3-bit coded data per input bit (i.e., forward error correction code) using the rate R=1/3 channel encoder 210, inserts the power control bit in the coded data after symbol repetition (220) and interleaving (230), and then transmits the PCB-inserted coded data using the three carriers. That is, the multi-carrier CDMA forward link of FIG. 2 divisionally transmits the input data on the three carriers after encoding, interleaving and demultiplexing.

Figure 3:
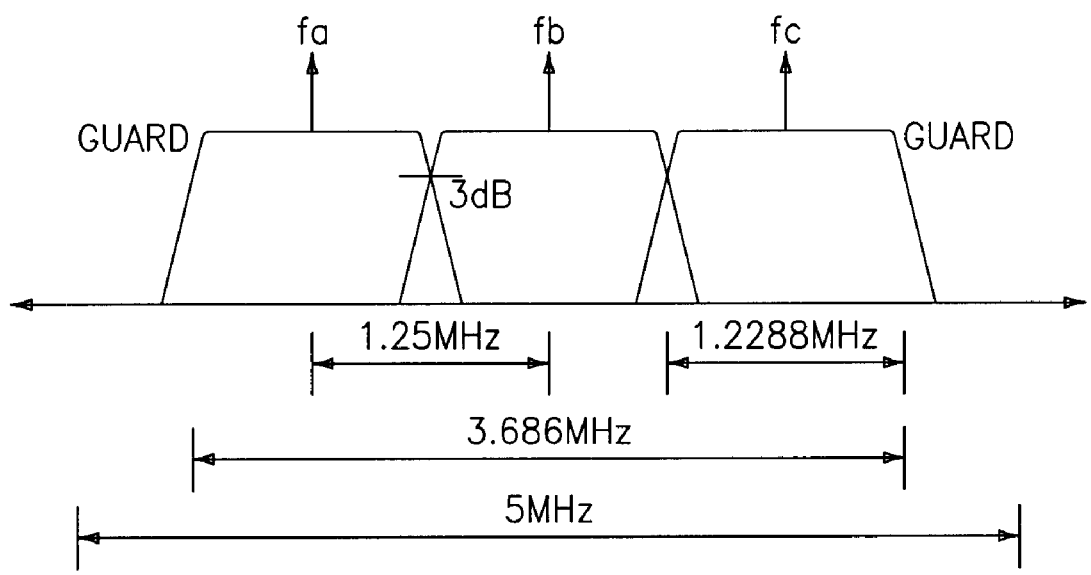
FIG. 3 is a diagram illustrating a transmission frequency format in a multi-carrier CDMA mobile communication system.

FIG. 3 shows the transmission frequencies modulated by the multiple carriers, by way of example. Referring to FIG. 3, the respective carriers fa, fb, and fc all have the same bandwidth of 1.2288 MHz (hereinafter, referred to as 1.25 MHz for short), which is identical to the 3 IS-95 channel bandwidths. Therefore, the total bandwidth for the three carriers is 3.6864 MHz, and becomes 5 MHz including the guard bands at each side thereof. This is identical to the 3 IS-95 channel bandwidths. However, with regard to each 1.25 MHz carrier, transmission power of the base station varies with the passage of time due to a variation in the number of subscribers (traffic channels) in service or a variation in voice activity of the subscribers, so that transmission power assigned to each path will be varied in the multi-carrier system. Therefore, the mobile station extracts the power control bits for the respective paths from the signals carried by the multiple carriers, combines the extracted power control bits, and then controls transmission power of the reverse link using the combined results.

Particularly, in order to control transmission power of the reverse link according to the invention, a base station having the above-stated multi-carrier transmission device of FIG. 2 measures receiving power of a signal transmitted from the mobile station, generates power control bits according to the measured results, and transmits the generated power control bits to the mobile station through the multi-carrier transmission signals. Upon receipt of the signals transmitted from the multi-carrier transmission device, the mobile station generates power control commands according to the power control bits extracted from the multiple carrier transmission signals, thereby performing reverse power control. In particular, where the mobile station communicates, i.e., transmits and/or receives data, using the multiple carriers, the mobile station requires a receiving device for extracting the power control bits from the signals transmitted from the base station over the multiple carriers in order to control the transmission power of the reverse link. In addition, the receiving device of the mobile station must then output the power control commands to a power controller therein. In addition, since the same carrier transmission signal can be transmitted through different paths, the receiving device should be able to output the power control commands after combining the power control bits provided through different paths.

Figure 4:
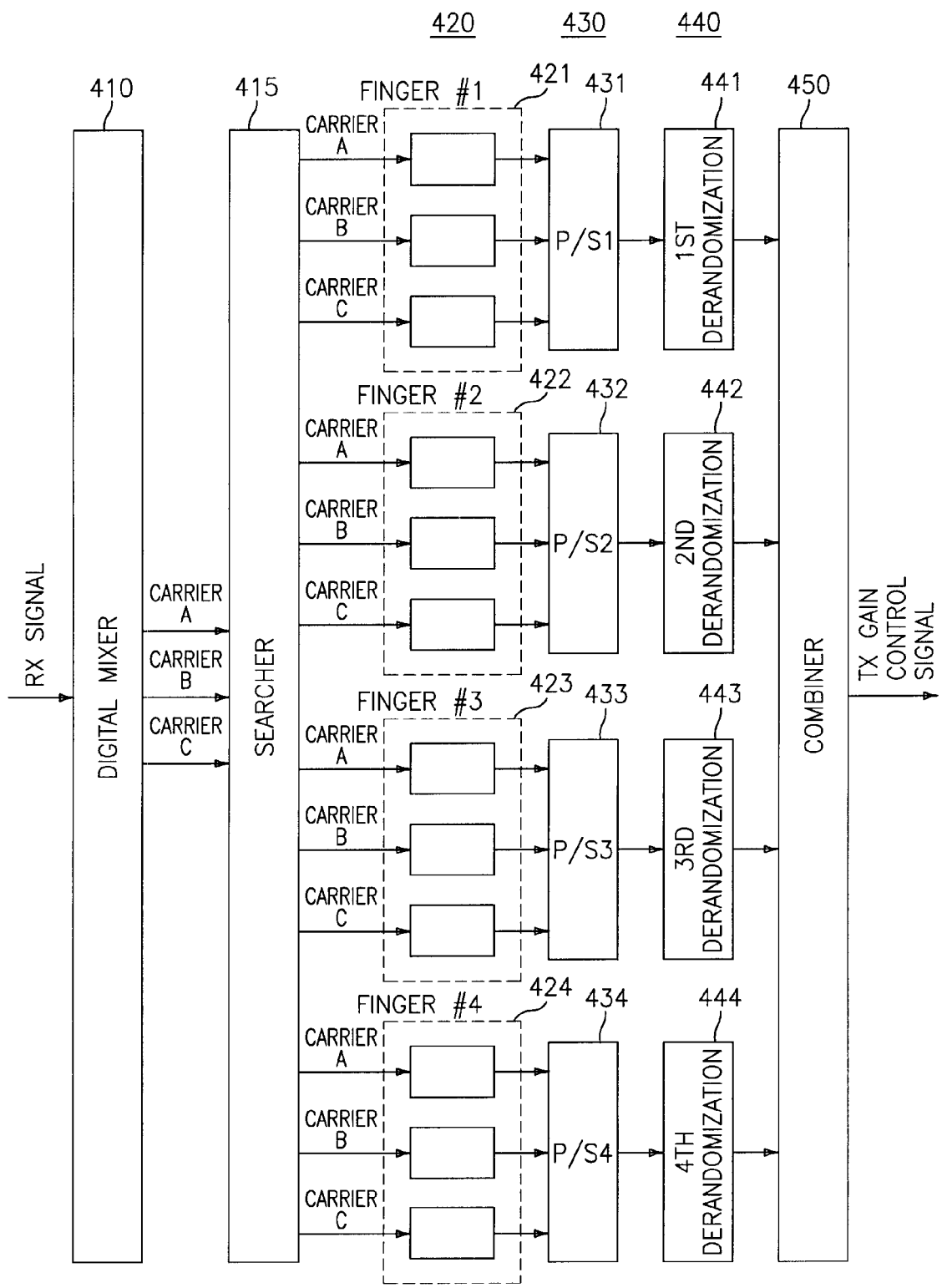
FIG. 4 is a block diagram illustrating, a device for combining power control commands in a mobile station receiving device for a multi-carrier CDMA mobile communication system according to an embodiment of the present invention.

A receiving device in the mobile station that accomplishes this has the structure shown in the embodiment of FIG. 4. A digital mixer 410 divides the signal received (as shown in the wide band of FIG. 3) according to three carriers. By way of example, the multi-carrier system uses three carriers A, B and C, as the three carriers are labelled (by subscript) in FIG. 3.

A searcher 415 separates the signals divided by the digital mixer 410, according to transmission paths. Signals are separated according to transmission path because they may have different delay time when transmitted through different paths even though the signals received were transmitted from the same base station. Since carriers transmitted through the same path have the same delay time, it is possible to first separate carrier A by transmission path and then separate carriers B and C by matching their transmission path with one of the transmission paths of previously separated carrier A. Therefore, the signals output through the digital mixer 410 and the searcher 415 can be regarded as groups of the carriers transmitted from the same base station through the same path. The searcher 415 may separate the received signals according to transmission path in the same manner as in the single carrier CDMA mobile communication system, for example.

A finger section 420 includes four fingers 421–424 that demodulate the respective carriers output from the searcher 415. As mentioned above, even though the same data is transmitted from the same base station, the same data is received with a different time lag since it is transmitted through various paths. The carriers output from the searcher 415 are separated according to transmission path in the searcher 415. It is not possible to demodulate the data received with different time lag using a single finger. Accordingly, a separate finger is required in order to demodulate data received having a different lag time. Thus, in order to demodulate late data having different lag times, two or more fingers are needed. In the embodiment of FIG. 4, for example, the receiving device includes four fingers 421–424, which means that it is possible to separate signals received having four different lag times, or, equivalently, having four different transmission paths. Each finger 421–424 can demodulate three carrier signals A, B and C having the same path as separated and output by searcher 415. Each finger also performs PN despreading and orthogonal despreading on the corresponding channels. In addition, the fingers 421–424 each include FIFO (First In, First Out)-type buffers (not shown) at the output ends thereof to compensate for the time lags of the signals output therefrom, thereby synchronizing the signals.

Parallel-to-serial (P/S) converters 431–434 convert the parallel carrier signals output from the associated fingers 421–424 to serial signals, respectively. A separate P/S converter receives the output of each finger. De-randomizers 441–444 each include a long code generator (not shown), and de-randomize the signals which were randomized during transmission. A separate de-randomizer receives the output of each P/S converter. A cell & power control bit combiner 450 (hereinafter referred to as a combiner, for short) separates the signals searched by the fingers 421–424, output from the de-randomizers 441–444, according to the cells, extracts the power control bits from separated signals, and generates a transmission gain control signal for controlling transmission power.

Figure 5:
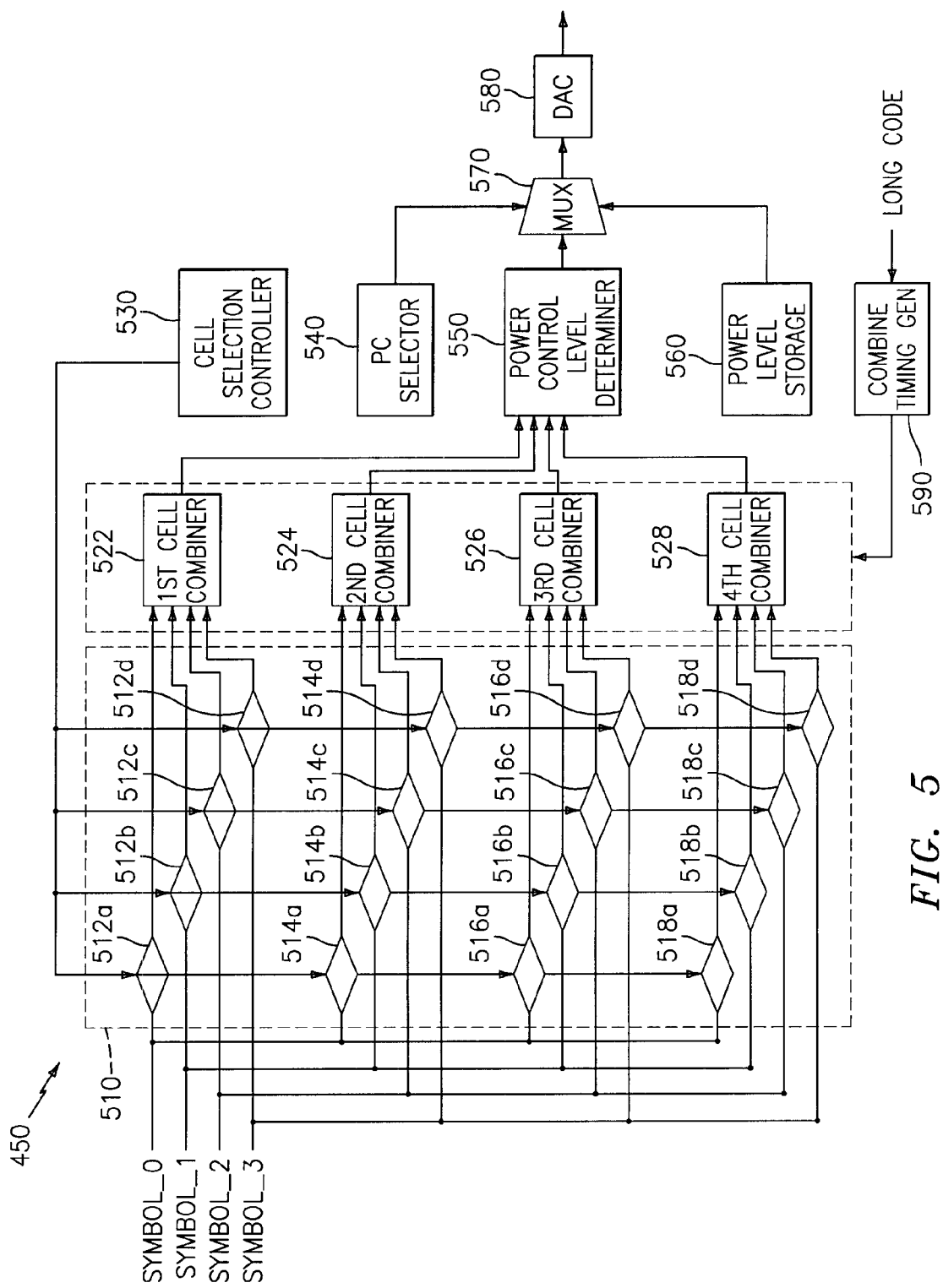
FIG. 5 is a diagram of the combiner of FIG. 4.

FIG. 5 shows the combiner 450 of FIG. 4. Referring to FIG. 5, a cell selection controller 530 generates a select signal for separating the received symbols according to cells, under the control of the searcher 415 of FIG. 4. Symbols are received from different base stations. Switches 510 (512a–512d, 514a–514d, 516a–516d, and 518a–518d) switch the received symbols according to the cell select signal output from the cell selection controller 530, and then apply the switched symbols to their associated cell combiners 520 (522–528). That is, since the signals received at the wide band are the signals transmitted from at least one base station, the signals from different base stations must be separated. In the embodiment, the cell selection controller 530 and the switches 510 provide the separation. Switches 512a–512d switch the received symbols Symbol_0–Symbol_3 to the first cell combiner 522 when they are switched by a select signal from the cell selection controller 530. Switches 514a–514d switch the received symbols Symbol_0—Symbol_3 to the second cell combiner 524 when they are switched by a select signal from the cell section controller 530. Further, switches 516a–516d switch the received symbols Symbol_0–Symbol_3 to the third cell combiner 526 when they are switched by a select signal from the cell selection controller 530, and switches 518a–518d switch the received symbols Symbol_0–Symbol_3 to the second cell combiner 528 when they are switched by a select signal from the cell selection controller 530. The cell combiners 520 each combine only the power control bits of the signals from the same cells, output from the associated switches 510. Thus, the cell combiners 520 extract the power control bits included in the symbols in order to combine the power control bits. A combine timing generator 590 generates timing for the combiners based upon the power control bit positions detected from the long code used for the last several bits of the previous power control group.

Each separate cell combiner 520 processes signals received from a different base stations. Thus, in order to process signals from different base stations, at least two (or more) cell combiners are needed. For example, in order to process symbols received from four different base stations, there are required at least four cell combiners 522–528. Therefore, a plurality of switches 520 switch the four symbols to the associated cell combiners 522–528, respectively. That is, switches 512a–512d are used to switch the four symbols to the first cell combiner 522, respectively, and switches 514a–514d are used to switch the four symbols to the second cell combiner 524, respectively. Further, switches 516a –516d are used to switch the four symbols to the third cell combiner 526, respectively, and switches 518a–518d are used to switch the four symbols to the fourth cell combiner 528, respectively. Herein, it is assumed that the cell combiners 520 include first to fourth cell combiners 522–528. A power control level determiner (or high detector) 550 generates a transmission gain control signal depending on the power control bits provided from the cell combiners 520, and outputs it with a predetermined level value. A power level storage 560 stores either a power level value previously generated or a predetermined level value corresponding to the transmission gain control signal required in controlling transmission power. A power control (PC) selector 540 generates a select signal for selecting outputs of the power control level determiner 550 or the power level storage 560 according to a condition of the transmission signals transmitted from the transmission device of the mobile station. In the case where power control is performed using a traffic channel, the power control selector 540 activates only the traffic channel and disables other channels. A multiplexer 570 selects the output of either the power control level determiner 550 or the power level storage 560 by the power control selector 540. A digital/analog converter (DAC) 580 converts the data output from the multiplexer 570 to an analog signal and provides an automatic gain controller (AGC) of the mobile station transmitter with the converted analog signal as a transmission gain control signal for controlling transmission power.

Operation of the embodiment of the present invention is described below, where it is assumed that the signal received by the mobile phone was modulated by 3 different carriers.

First, upon receipt of a wide band signal having the 3 different carriers fa, fb and fc shown in FIG. 3, the digital mixer 410 detects the center carrier fb. After detecting the center carrier fb, the digital mixer 410 filters the signal in the center carrier fb band, and then filters the signals in the carrier fa and fb bands while shifting right and left centering on the center carrier fb. Herein, a signal filtered centering on fa will be referred to as a carrier A, a signal filtered centering on fb will be referred to as a carrier B, and a signal filtered centering on fc will be referred to as a carrier C. Therefore, the digital mixer 410 filters the received multi-carrier signals according to the carriers and then converts the filtered signals to baseband signals. At this point, the converted baseband signals are simply distinguished according to the carriers, without taking into consideration the transmission pass delay. The signals output from the digital mixer 410 are divided into the carriers A, B and C.

The signals output from the digital mixer 410 are provided to the searcher 415. The carriers A, B and C provided to the searcher 415 may have either the same path delay or different path delay. The signals are thus divided according to path delays by searcher 415. Since signals (carriers A, B and C) having the same path delay are classified into one group, it is only necessary to determine the path delay for the first carrier A, and the path delay for the carriers B and C follows the analyzed carrier A. The searcher 415 analyzes the path of the received signals, and only divides the signals according to the path delays. Accordingly, the signals output from the searcher 415 are not synchronized to one another based upon different path delays.

The signals divided according to path delays are assigned to the fingers 421–424. Signals having the same path delay are applied to the same fingers. The fingers 421–424 then performs PN & Walsh despreading on the signals (carriers A, B and C) having the same path delay to demodulate the signals, and synchronize the demodulated signals. As stated above, the reason for synchronizing the demodulated signals is because the signals provided to the fingers 421–424 have different path delays and are not synchronized to one another. Synchronizing the demodulated signals may be performed, for example, by providing FIFO-type buffers at the output ends of the fingers 421–424.

The demodulated signals synchronized by the fingers 420 are provided to the associated P/S converters 431–434. As stated above, in the multi-carrier system, the base station performs PCB puncturing before P/S conversion. Further, since the puncturing positions are determined by randomization (or scrambling) using the long code, the power control commands should be extracted performing P/S conversion and after after combining the path delay signals of the carriers. Therefore, in the receiving device, the P/S converters 431–434 convert the received signals output from the fingers 421–424 to serial data, and the de-randomizers 441–444 de-randomize the P/S converted data using the same long code as that used in the base station, and then provide the de-randomized data to the combiner 450.

As described in more detail below, the combiner 450 divides the de-randomized signals according to cells (i.e., according to signals transmitted from different base stations), extracts the power control bits from the divided signals, and combines the extracted power control bits to generate a power control signal for the transmission device. It is possible to determine whether the power control bits have been received from the cell in service or from other cells, through the searcher 415.

The signals output from the de-randomizers 440 are provided to the switches 510. For example, as illustrated in the drawing, the input signals are expressed as four symbols Symbol_–Symbol_3. The switches 510 perform switching operation under the control of the cell selection controller 530 to provide the four input symbols to the corresponding cell combiners 520. The cell selection controller 530, under the control of the searcher 415, generates the cell select control signal for dividing the signals provided from the de-randomrizers 440 according to cells. Typically, a microprocessor is used for the cell selection controller 530. Therefore, the switches 510 are selectively switched according to the cell select control signal, so as to provide only the specific symbols out of the four symbols to the cell combiners 520.

For example, if symbols Symbol_0 and Symbol_1 are provided from the same cell and Symbol_2 and Symbol_3 are provided from different cells, the cell selection controller 530 generates the cell select control signal such that the symbols Symbol_0 and Symbol_1 are provided to the same cell combiner and the other symbols are provided to different cell combiners. That is, the cell selection controller 530 will output a cell select control signal for turning on the switches 512a and 512b to provide Symbol_0 and Symbol_1 to the first cell combiner 522, a cell select control signal for turning on the switch 514c to provide the Symbol_2 to the second cell combiner 524, and a cell select control signal for turning on the switch 516d to provide the Symbol_3 to the third cell combiner 526.

The cell combiners 520 then combine the power control bits transmitted from the corresponding cells. To this end, the cell combiners 520 must know the timing for extracting the power control bits from the symbols. With regard to the power control bits, when a 0 bit indicates a command for increasing transmission power of the mobile station, a 1 bit indicates a command for decreasing transmission power of the mobile station. In 1.25 ms (i.e., one power control group), a duration where the power control bit is inserted after puncturing according to Rate Set 1 and Rate Set 2 corresponds to 16 and 32 modulated symbol durations, respectively. There exist two consecutive power control bits, and a starting position of the power control bits can be determined by a long code whose last 3 (Rate Set 1) or 4 (Rate Set 2) bits of the previous power control group are masked.

The power control level determiner 550 generates a transmission gain control signal according to the power control bits provided from the cell combiners 520, and outputs it with a predetermined level value. Thus, the determiner 550 uses power control bits from cell combiners 522–528 having symbols from different base stations. In an exemplary method for determining the transmission gain control signal according to the power control bits, when all the provided power control bits request an increase in transmission power, the power control level determiner 550 generates a transmission gain control signal for increasing transmission power. However, if even one of the provided power control bits requests a decrease in transmission power, the power control level determiner 550 generates a transmission gain control signal for decreasing transmission power.

The multiplexer 570 is provided with the transmission gain control signal from the power control level determiner 550 and the power level value from the power level storage 560. The power level storage 560 stores the power level value controlled in the previous state or a level value previously set according to a transmission condition of the mobile station transmitter. The multiplexer 570 receiving outputs of the power control level determiner 550 and the power level storage 560 and selectively outputs a level value corresponding to the transmission gain control signal, under the control of the power control selector 540. When power control is performed using a traffic channel, the power control selector 540 activates only the traffic channel and disables the other channels.

The level value of the transmission gain control signal selectively output from the multiplexer 570 is converted to an analog signal by the digital/analog converter 580. The converted analog signal is output to an automatic gain controller (AGC) of the mobile station transmitter as a control signal for controlling transmission power, thereby performing reverse power control for controlling transmission power of the mobile station.

As described above, to control transmission power of the reverse link, the novel communication system exchange data using multiple carriers extracts power control bits from the multi-carrier signals received at the wide band, combines the extracted power control bits, and provides the combined power control bits to the power controller of the mobile station transmitter. In this manner, the multi-carrier CDMA mobile communication system can perform reverse power control, thereby efficiently utilizing transmission power of the mobile station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for controlling transmission power of a mobile station in a multi-carrier CDMA (Code Division Multiple Access) mobile communication system, comprising:

a digital mixer that receives multi-carrier signals, divides the multi-carrier signals according to carrier and filters the divided carrier signals;

a searcher that interfaces with the digital mixer and separates the divided carrier signals according to carrier signals which have the same path delay;

a plurality of fingers, each finger despreading and demodulating the carrier signals which have the same path delay, the carrier signals having the same path delay being input in parallel from the searcher to the fingers, the finger synchronizing its respective demodulated signal with the demodulated signals of the other fingers; and a plurality of parallel/serial (P/S) converters that receive the demodulated signals from the fingers and convert the demodulated signals from parallel to serial signals;

a combiner that receives the demodulated serial signals and separates the demodulated serial signals according to cells, and generates a transmission gain control signal based upon power control bits extracted from the separated demodulated signals for a transmission device of a mobile station.

2. The device as claimed in claim 1, wherein the combiner comprises:

a cell selection controller that generates a cell select control signal under the control of the searcher;

a plurality of switches that interface with the de-randomizers and separate the de-randomized demodulated signals according to cells based upon the cell select control signal;

two or more cell combiners interfacing with the plurality of switches, the switches supplying separate cell combiners with the signals from a same cell, the cell combiners combining power control bits of the supplied signals;

a timing generator that interfaces with the cell combiners and supplies the cell combiners with timing signals for combining the power control bits;

a power control level determiner that interfaces with the cell combiners and determines a final power control bit using the combined power control bits of the cell combiners and outputting the transmission gain control signal; and a digital/analog converter that interfaces with the power control level determiner and converts the transmission gain control signal to an analog signal and provides the converted analog signal to the transmission device of the mobile station.

3. The device as claimed in claim 2, further comprising:

a power level storage that stores a power control level;

a selector that generates a power control select signal according to a transmission power condition of the mobile station; and a multiplexer that interfaces with the selector, the power level storage and the power control level determiner, the multiplexer outputting as the transmission gain control signal one of the output of the power control level determiner or the power level storage based upon the power control select signal.

4. A method for controlling transmission power of a mobile station in a multi-carrier CDMA mobile communication system, comprising the steps of:

filtering for dividing received multi-carrier signals according to carrier;

separating the divided carrier signals according to carrier signals which have the same path delay;

separately performing despreading and demodulation on carrier signals which have the same path delay, the despreading and demodulation for carrier signals having different path delays being performed in parallel, and synchronizing the demodulated signals;

converting the demodulated signals from parallel to serial signals;

separating the demodulated serial signals according to cells; and generating a transmission gain control signal for a transmission device of a mobile station according to power control bits extracted from the separated demodulated signals.

5. The method as claimed in claim 4, wherein the step of generating the transmission gain control signal comprises the steps of:

generating a cell select control signal;

separating the de-randomized demodulated signals according to the cells based upon the cell select control signal;

combining power control bits of the de-randomized demodulated signals from the same cells;

determining a level of a final power control bit using the combined power control bits of the cell combiners and outputting the transmission gain control signal; and converting the transmission gain control signal to an analog signal and providing the converted analog signal to the transmission device of the mobile station.

6. The method as claimed in claim 5, further comprising the steps of:

generating a power control select signal according to a transmission power condition of the mobile station; and outputting one of a previously set power level or a power level determined according to the final power control bit based upon the transmission gain control signal.

* * * * *